United States Patent [19]

Hirai

[11] Patent Number: 5,069,534
[45] Date of Patent: Dec. 3, 1991

[54] ACTIVE MATRIX LIQUID CRYSTAL DISPLAY WITH SERIES-CONNECTED MIM STRUCTURES AS A SWITCHING ELEMENT

[75] Inventor: Yoshihiko Hirai, Tokyo, Japan

[73] Assignee: NEC Corporation, Tokyo, Japan

[21] Appl. No.: 511,137

[22] Filed: Apr. 19, 1990

[30] Foreign Application Priority Data

Apr. 19, 1989 [JP] Japan ................. 1-100455

[51] Int. Cl.[5] .............................................. G02F 1/13
[52] U.S. Cl. ......................................... 359/54; 357/2; 357/4; 359/74; 359/87
[58] Field of Search ............... 350/333, 334, 336, 332, 350/339 R; 357/214, 23.7

[56] References Cited

U.S. PATENT DOCUMENTS

| 4,523,811 | 6/1985 | Ota | 350/336 |
| 4,683,183 | 7/1987 | Ono | 350/334 |
| 4,828,370 | 5/1989 | Suzuki | 350/333 |
| 4,842,372 | 6/1989 | Toyama | 350/333 |
| 4,861,141 | 8/1989 | Nakazawa | 350/336 |
| 4,943,802 | 7/1990 | Kuijk | 350/333 |
| 4,958,152 | 9/1990 | Kuijk et al. | 350/333 |

FOREIGN PATENT DOCUMENTS

| 0031321 | 2/1983 | Japan | 350/333 |
| 0045222 | 3/1986 | Japan | 350/336 |
| 0059217 | 3/1989 | Japan | 350/336 |

OTHER PUBLICATIONS

A 250×240 Element LCD Addressed by Lateral MIM, S. Morozumi et al., JP Display 83.
LCTV Addressed by MIM Devices, Niwa et al., SID 84 Digest.

Primary Examiner—Rolf Hille
Assistant Examiner—Tan Ho
Attorney, Agent, or Firm—Sughrue, Mion, Zinn, Macpeak & Seas

[57] ABSTRACT

A liquid crystal display comprises a plurality of first parallel electrodes arranged on a first plane, and a plurality of second parallel electrodes extending in a direction normal to the first parallel electrodes and arranged on a second plane spaced from the first plane. Between the first and second plane is a layer of twisted nematic liquid crystal. A matrix array of pixel electrodes are respectively arranged on the first plane at intersections of the first and second parallel electrodes. A matrix array of switching elements are associated respectively with the pixel electrodes. The switching elements are subdivided into groups which are associated respectively with the first parallel electrodes. Each switching element comprises a plurality of metal-insulator-metal laminated structures with the insulator having a nonlinear resistance characteristic. The metal-insulator-metal structures are series-connected between the associated first electrode and the associated pixel electrode for establishing a switched connection therebetween in response to a potential developed at an intersection of the first and second parallel electrodes.

3 Claims, 5 Drawing Sheets

ACTIVE MATRIX LIQUID CRYSTAL DISPLAY WITH SERIES-CONNECTED MIM STRUCTURES AS A SWITCHING ELEMENT

BACKGROUND OF THE INVENTION

The present invention relates generally to liquid crystal displays, and more specifically to an active matrix liquid crystal display.

To overcome shortcomings inherent to nonactive liquid crystal displays, active matrix liquid crystal displays have been developed so far using switching elements at intersections of X-Y electrodes. For large panel applications, the most promising device for the switching element is a metal-insulator-metal structure in which the insulator is composed of silicon nitride as described in M. Suzuki et al. "A New Active Diode Matrix LCD Using Off-Stoichiometric SiNx Layer", Proceedings of the SID, Vol. 28 pages 101–104, 1987. While satisfactory in terms of its high nonlinear coefficient and low manufacturing cost, one shortcoming of the MIM structure is that a short circuit can occur in the insulator due to its small thickness (which is typically 100 nanometers), causing pin-hole defects which result in a low yield during manufacture. A further disadvantage of the prior art display is that it flickers when voltages of opposite polarity are applied since the voltage-current characteristic is asymmetric with respect to different polarities.

SUMMARY OF THE INVENTION

It is therefore an object of the present invention to provide an active matrix liquid crystal display which can be fabricated with reduced pixel defects and ensures a high yield during manufacture and which eliminates flickers.

According to the present invention, there is provided a liquid crystal display which comprises a plurality of first parallel electrodes arranged on a first plane, and a plurality of second parallel electrodes extending in a direction normal to the first parallel electrodes and arranged on a second plane spaced from the first plane. Between the first and second plane is a layer of twisted nematic liquid crystal. A matrix array of pixel electrodes are respectively arranged on the first plane at intersections of the first and second parallel electrodes. A matrix array of switching elements are associated respectively with the pixel electrodes. The switching elements are subdivided into groups which are associated respectively with the first parallel electrodes. Each switching element comprises at least two metal-insulator-metal laminated structures having a nonlinear resistance characteristic. The metal-insulator-metal structures are series-connected between the associated first electrode and the associated pixel electrode for establishing a switched connection therebetween in response to a potential developed at an intersection of the first and second parallel electrodes.

Preferably, each switching element comprises a plurality of parallel first conductive members disposed on a same plane. An outermost one of the first conductive members extends from the associated first electrode and another outermost first conductive member extends from the associated pixel electrode. A plurality of parallel second conductive members are provided so that each second conductive member overlies a different pair of the first conductive members. A nonlinear resistance layer is disposed so that its first surface contacts the first conductive members and its second, opposite surface contacts the second conductive members.

BRIEF DESCRIPTION OF THE DRAWINGS

The present invention will be described in further detail with reference to the accompanying drawings, in which.

DETAILED DESCRIPTION

Figure 1:
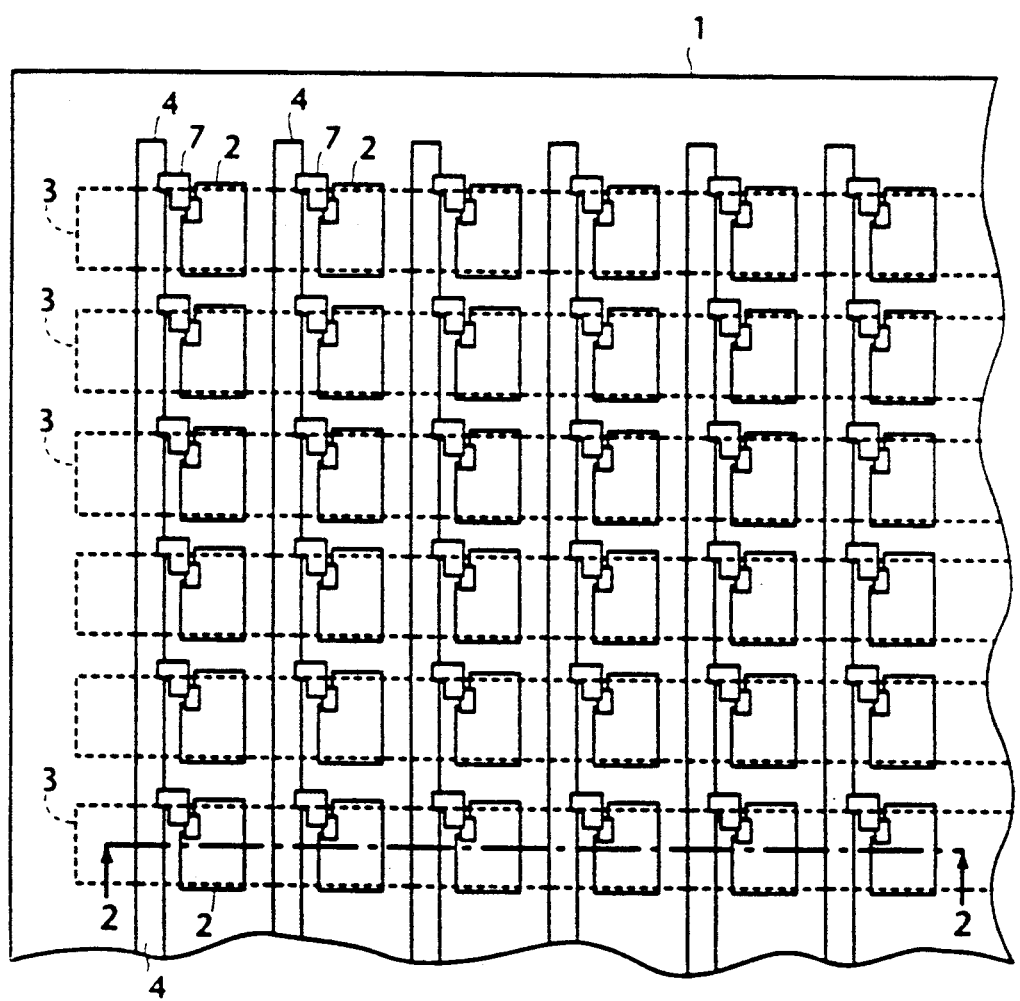
FIG. 1 is a plan view of an active matrix liquid crystal display embodying the present invention.
Figure 2:
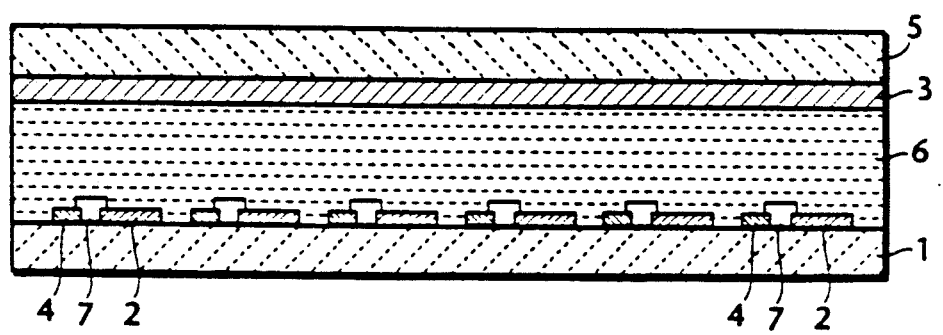
FIG. 2 is a cross-sectional view taken along the line 2—2 of FIG. 1.

Referring now to FIGS. 1 and 2, there is shown a liquid crystal display according to a first embodiment of the present invention. The display comprises a lower glass plate 1 on which a plurality of generally rectangular-shaped transparent pixel electrodes 2 are arranged in an X-Y matrix array, and those pixel electrodes 2 which are arranged in columns are connected respectively to column electrodes 4 of indium tin oxide. Row electrodes, as indicated by dotted lines 3, are formed on the lower side of an upper glass plate 5 in opposed relationship with those pixel electrodes which are arranged in rows. The four edges of the lower and upper plates 1 and 5 are secured together by means of spacers, not shown, to provide a sealed air-tight chamber with a thickness of 5 micrometers in which a layer 6 of twisted nematic liquid is filled. Each pixel electrode 2 is connected by a thin-film diode (TFD) 7 which comprises at least two MIM (metal-insulator-metal) structures in a manner as will be described below. Although not shown in FIG. 2, alignment layers are formed between the opposite surfaces of the liquid crystal layer 6 to facilitate alignment of twisted nematic liquid crystals.

EXAMPLE I

Figure 3A:
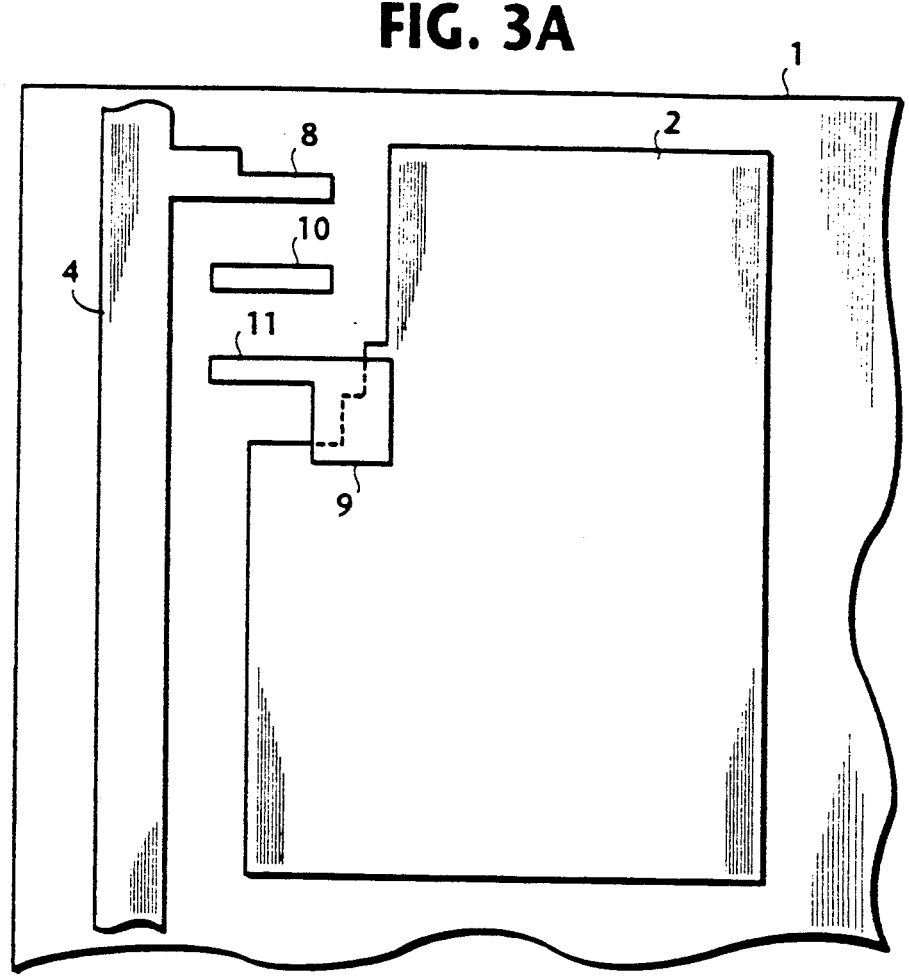
FIGS. 3A-3C are plan views illustrating steps of fabricating a thin-film diode device.
Figure 3B:
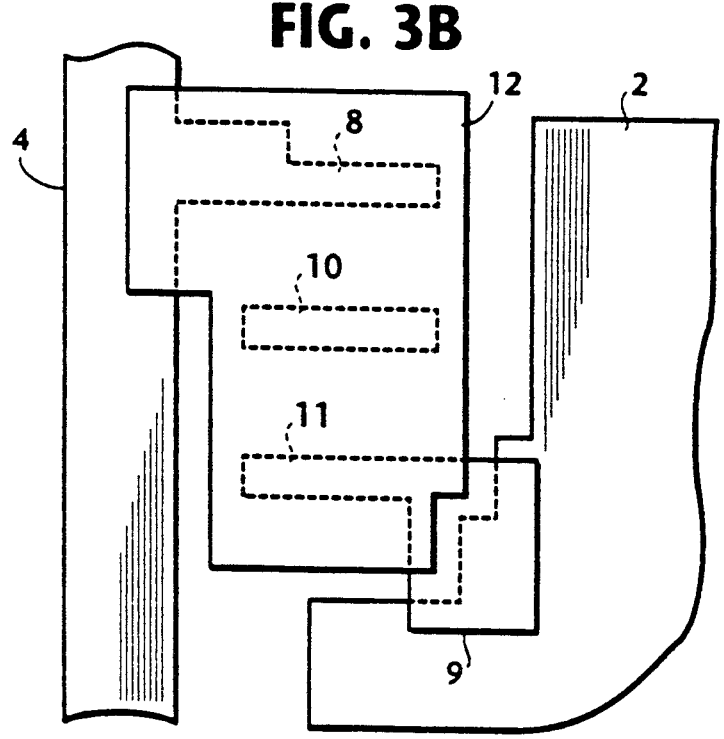
Figure 3C:
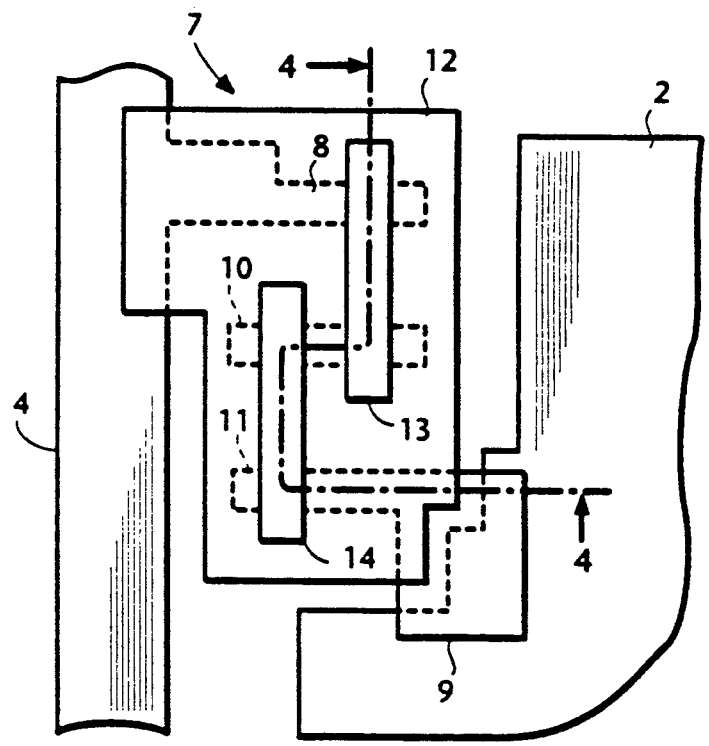

Each switching element 7 was fabricated in a manner as shown in FIGS. 3A to 3C. In FIG. 3A, pixel electrodes 2 of indium tin oxide were first deposited on the glass plate 1 in a matrix pattern as pixel electrodes. The upper-left corner of each pixel electrode 2 was patterned to form a cutout portion as illustrated in FIG. 3A to provide a space for an associated switching element 7. Using a photolithographic method, column electrodes 4 were formed by vacuum deposition of chromium particles on the plate 1 until a thickness of 100 nanometers was attained. Each column electrode 4 was patterned to form a plurality of extensions 8 extending parallel to row electrodes 3. Simultaneously, a coupling conductor 9 and an intermediate conductor 10 were formed, each having the same thickness as column electrode 4. Coupling conductor 9 has an elongated portion 11 which extends from its major portion which is deposited on a stepped-corner portion of the pixel electrode 2. Extension 8, intermediate conductor 10 and extension 11 run parallel to each other.

In FIG. 3B, using a glow-discharge decomposition method, a gaseous mixture of SiH$_4$ and N$_2$ with a SiH$_4$/N$_2$ ratio of 0.08 was deposited to a thickness of 150 nanometers over the elements 8, 10 and 11 in a generally rectangular pattern to form a silicon nitride layer 12, which serves as a nonlinear resistance element, or insulator parts of metal-insulator-metal structures. Subsequently, chromium particles were then photolithographically deposited over the nonlinear resistance element 12 to form a pair of elongated parallel upper conductors 13 and 14 with a thickness of 100 nanometers.

Figure 4:
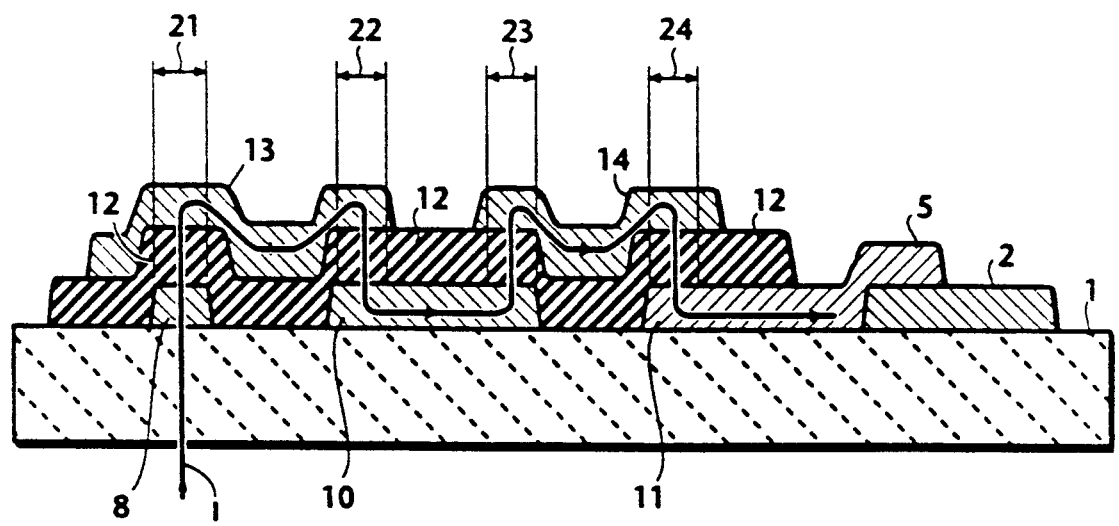
FIG. 4 is a cross-sectional view taken along the line 4—4 of FIG. 3C.

As shown in FIG. 4, if a potential is applied across column electrode 4 and a corresponding row electrode, a current flows as indicated by a thick line "l" from conductor 8 to pixel electrode 2, passing through a first MIM (metal-insulator-metal) region 21 formed by elements 8, 12 and 13, a second MIM region 22 formed by elements 13, 12 and 10, a third MIM region 23 formed by elements 10, 12 and 14, and finally through a fourth MIM region 24 formed by elements 14, 12, and 11. Therefore, a series of four MIM devices are formed between electrodes 2 and 4.

A voltage-versus-current characteristic of the TFD device 7 was measured across electrodes 2 and 4. Due to the provision of series-connected four MIM structures, the voltage-current characteristic of the switching element 7 is symmetric with respect to the opposite polarities of applied voltage. A nonlinear coefficient of 8 was measured by the V-I characteristic. This indicates that at least 1000 scanning lines can be provided for the liquid crystal display. A display with a resolution of 640×400 pixels was constructed to evaluate its operating performance. A contrast ratio of more than 30:1 was obtained with an operating voltage of 32 volts. A hundred panels with a resolution of 640×400 pixels were constructed according to the method described above to determine their failure rate. The test indicates that among 100 panels five were found to have at least one pin-hole defect, which compares favorably with a test conducted on 100 panels of the prior art display in which as many as 56 were detected as having at least one pin-hole defect. This is due to the fact that a pinhole defect in one MIM structure causes it to be short-circuited, allowing the other MIM structures to be remain connected between the associated pixel electrode and the associated column electrode.

EXAMPLE II

The same steps as in Example I were used to fabricate a TFD 7 with the exception that the nonlinear resistance layer 12 was prepared as follows.

A gaseous mixture of SiH$_4$ and N$_2$ with a SiH$_4$/N$_2$ ratio of 0.08 was first deposited using a glow discharge decomposition method to form a 120-nanometer thick silicon nitride layer. Subsequently, using the same decomposition method, SiH$_4$ gas containing 1% phosphorous gas was deposited on the silicon nitride layer to form an amorphous silicon layer of thickness 10 to 30 nanometers. An operating voltage of as low as 25 volts was obtained, while retaining the same performance as in Example I for other operating characteristics.

EXAMPLE III

As a modification of Example II, the nonlinear resistance layer 12 was prepared by a mixing SiH$_4$ gas and N$_2$ gas with a ratio of 1 for SiH$_4$ to 0.01 for N$_2$ and the gaseous mixture was deposited using the glow discharge decomposition method to form a 10–30 nanometer thick silicon nitride layer. SiH$_4$ and N$_2$ were admixed with a ratio of 1 for SiH$_4$ to 0.08 for N$_2$, and the mixture was deposited by the glow discharge decomposition method on the silicon nitride layer until a thickness of 120 nanometers was attained. A nonlinear coefficient of as high as 11 and an operating voltage of as low as 22 volts were obtained, while retaining the same performance as in Example I for other operating characteristics.

EXAMPLE IV

Figure 5:
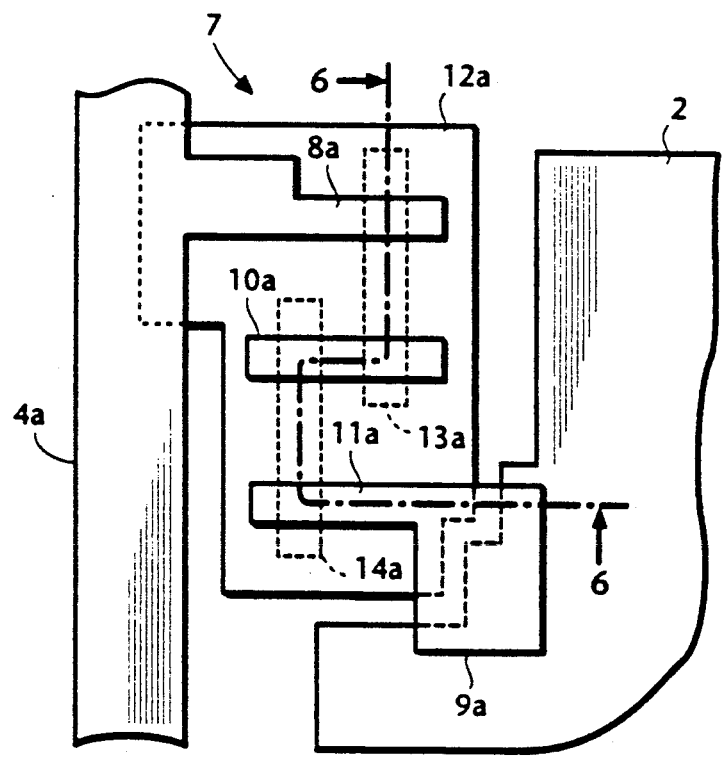
FIG. 5 is a plan view of a modification of the embodiment of FIG. 3C.
Figure 6:
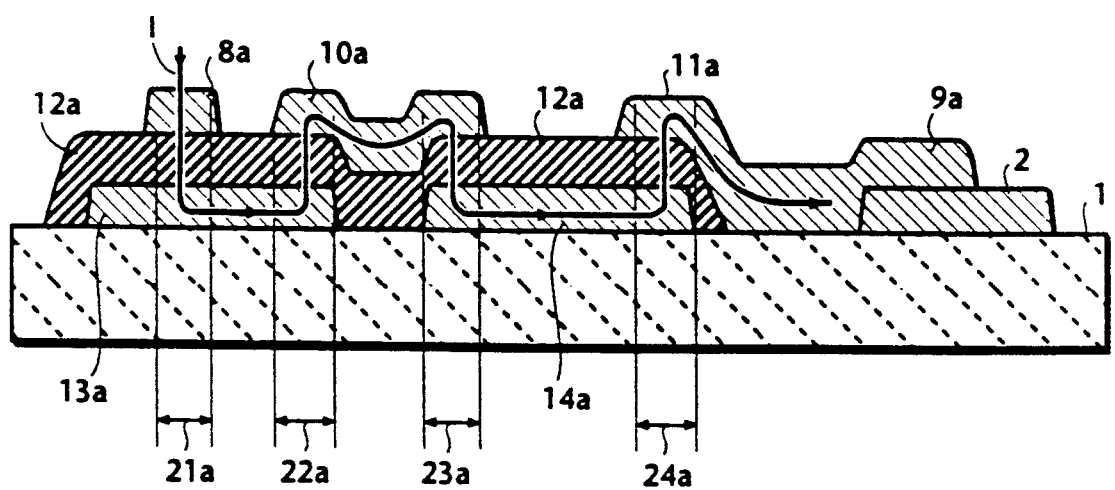
FIG. 6 is a cross-sectional view taken along the line 6—6 of FIG. 5.

As shown in FIG. 5, conductors 13a and 14a were first formed on the glass plate 1 followed by the formation of the nonresistance layer 12a. Finally, the column electrode 4a, intermediate conductor 10a and coupling conductor 9a were formed. All the steps involved in this Example were the same as in Example I. As shown in FIG. 6, a series of four MIM regions 21a (formed by elements 8a, 12a, 13a) 22a (by elements 13a, 12a, 10a), 23a (by elements 10a, 12a, 14a) and 24a (by elements 14a, 12a, 11a) are created. Similar results to those in Example I were obtained for all operating performances.

EXAMPLE V

Figure 7:
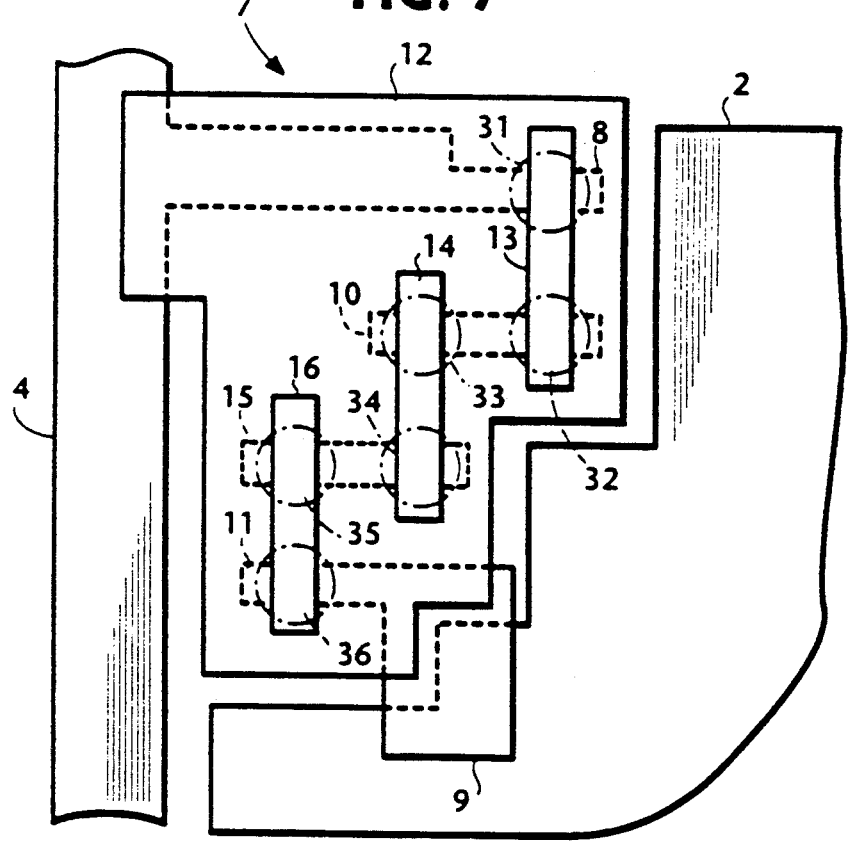
FIGS. 7 to 9 are plan views of further modifications of the embodiment FIG. 3C.

Using the same material and the same method of deposition as those in Example I, a lower conductor 15 was formed on the glass plate 1 and an upper conductor 16 on the nonlinear resistive layer 12 as shown in FIG. 7 so that lower conductor 15 extend between the end portions of upper conductors 14 and 16 and upper conductor 16 bridges across the end portions of conductors 15 and 11. With this structure, a total of six MIM regions are series-connected between electrodes 2 and 4 as marked by chain-dot circles 31 through 36. A hundred panels with a resolution of 640×400 pixels were constructed according to Example V. Tests indicate that only three were found to have more than one pinhole defect, which compares favorably with Example I.

EXAMPLE VI

Figure 8:
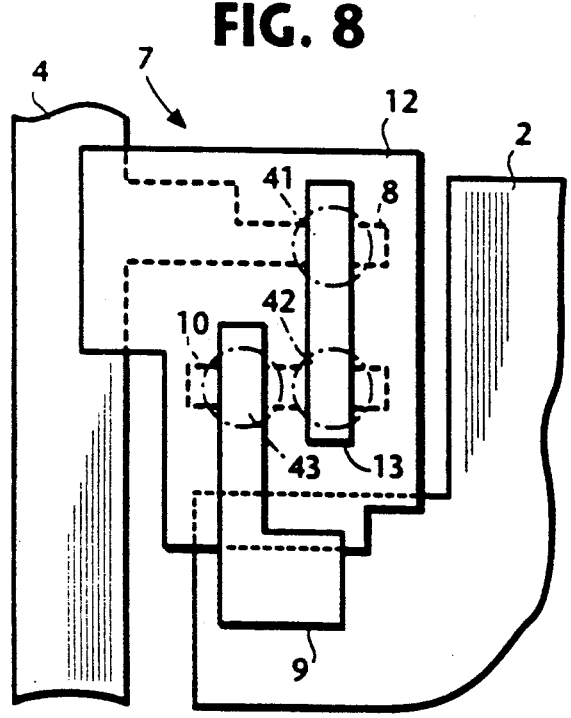

A variation of Example I is shown in FIG. 8 in which the MIM regions are reduced to three instead of four by using the coupling conductor 9, instead of the upper conductor 14 of FIG. 3C, as an upper conductor so that it overlies an end portion of lower conductor 10. MIM regions 41, 42 and 43 are thus formed as indicated in FIG. 8. Among a hundred panels with a resolution of 640×400 pixels constructed according to Example VI, tests indicate that eight were found to have more than one pin-hole defect. While Example VI compares unfavorably with Example I, the total areas of pixel electrodes 2 are greater than those of Example I, giving a higher level of brightness. Although the voltage-current characteristic of the three-element MIM structures loses some symmetrical nature in comparison with the four-element structures of FIG. 3C, its symmetricity is still better than the prior art V-I characteristic.

EXAMPLE VII

Figure 9:
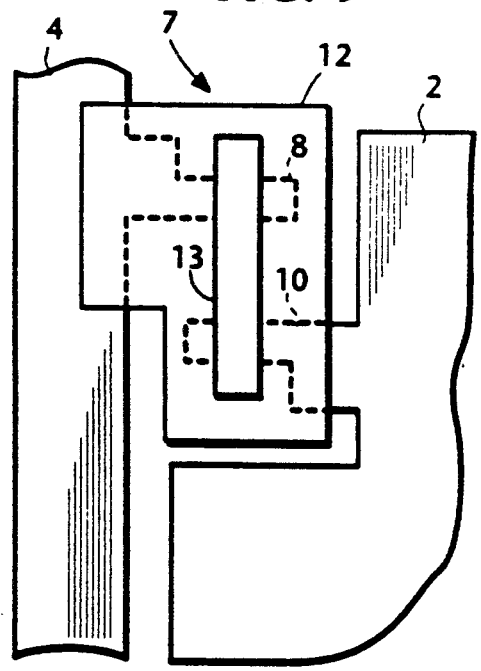

In a similar manner to Example VI, FIG. 9 shows a switching element which comprises two MIM structures formed by coupling the conductive member 10 to the pixel electrode 2 and eliminating the coupling element 9 of FIG. 8. In this embodiment, voltage-current characteristic was almost perfectly symmetrical, and flickers were not observed.

EXAMPLE VIII

Using the structure of FIG. 3C, the column electrode 4, coupling element 9, and lower intermediate conductor 10 were formed of tantalum, and a 75-nanometer thick nonlinear resistance layer 7 was formed of tantalum oxide by an anodic oxidation method using 0.1 weight percent of citric acid. The same operating characteristics and failure rate as those in Example I were obtained.

EXAMPLE IX

Using the structure of FIG. 3C, column electrode 4, coupling element 9 and lower intermediate conductor 10 were all formed of indium tin oxide according to photolithography to a thickness of 50 nanometers. The same operating characteristics and failure rate as those in Example I were obtained.

The foregoing description shows only preferred embodiments of the present invention. Various modifications are apparent to those skilled in the art without departing from the scope of the present invention which is only limited by the appended claims. For example, the silicon nitride layer of the same operating characteristic was obtained by depositing a mixture of $SiH_4$ and $NH_3$ or a mixture of $Si_2H_6$ and $N_2$. Other deposition techniques such as sputtering and chemical vapor deposition could equally be as well employed in the present invention. While mention has been made of chromium and indium tin oxide for conductive parts, other metals such as aluminum, molybdenum, tungsten and silicide could equally be as well employed.

What is claimed is:

1. A liquid crystal display comprising:
   a plurality of first electrodes arranged in parallel on a first plane;
   a plurality of second electrodes extending in a direction normal to said first electrodes and arranged in parallel on a second plane spaced from said first plane;
   a matrix array of pixel electrodes respectively arranged on said first plane at intersections of said first and second electrodes;
   a layer of liquid crystal between said first and second planes; and
   a matrix array of switching elements associated respectively with said pixel electrodes, each of said switching elements comprising:
   a first elongated conductive member extending from the associated first electrode;
   a second elongated conductive member extending in a direction parallel to said first conductive member and disposed on a same plane as said first elongated conductive member;
   a third elongated conductive member extending from the associated pixel electrode in a direction parallel to said first and second elongated conductive members and disposed on the same plane as said first and second elongated conductive members;
   a fourth elongated conductive member overlying said first and second elongated conductive members;
   a fifth elongated conductive member overlying said second and third elongated conductive members; and
   a nonlinear resistance layer having a first surface contacting said first, second and third elongated conductive members and a second, opposed surface contacting said fourth and fifth elongated conductive members.

2. A liquid crystal display as claimed in claim 1, wherein said nonlinear resistance layer is formed of silicon nitride.

3. A liquid crystal display as claimed in claim 1, wherein said nonlinear resitance layer comprises a first layer of silicon nitride and a second layer of amorphous silicon on said first layer.

* * * * *